United States Patent
Miyazaki et al.

(10) Patent No.: US 8,574,078 B2
(45) Date of Patent: Nov. 5, 2013

(54) GAME APPARATUS, COMMUNICATION APPARATUS, WIRELESS GAME CONTROLLER, AND GAME SYSTEM

(75) Inventors: Yoshio Miyazaki, Kanagawa (JP); Takanori Shimizu, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1817 days.

(21) Appl. No.: 11/789,043

(22) Filed: Apr. 23, 2007

(65) Prior Publication Data
US 2007/0287542 A1 Dec. 13, 2007

(30) Foreign Application Priority Data
Apr. 28, 2006 (JP) ................. 2006-126795

(51) Int. Cl.
A63F 9/24 (2006.01)

(52) U.S. Cl.
USPC ........... 463/39; 463/37; 463/40; 463/43; 455/63.1; 455/63.3; 455/574

(58) Field of Classification Search
USPC ......... 463/37, 39, 40, 43; 455/63.1, 63.3, 574
See application file for complete search history.

(56) References Cited

U.S. PATENT DOCUMENTS

| | | | |
|---|---|---|---|
| 5,618,045 A | 4/1997 | Kagan et al. | |
| 6,585,596 B1 * | 7/2003 | Leifer et al. | 463/39 |
| 6,659,871 B2 * | 12/2003 | Leifer et al. | 463/39 |
| 7,697,896 B2 * | 4/2010 | Maekawa et al. | 455/63.1 |
| 2002/0061743 A1 | 5/2002 | Hutcheson et al. | |
| 2002/0072410 A1 * | 6/2002 | Tanaka et al. | 463/37 |
| 2005/0169201 A1 | 8/2005 | Huylebroeck | |
| 2006/0195522 A1 | 8/2006 | Miyazaki | |
| 2007/0093294 A1 * | 4/2007 | Serafat et al. | 463/39 |
| 2009/0264200 A1 * | 10/2009 | Schwartz | 463/40 |

FOREIGN PATENT DOCUMENTS

| | | |
|---|---|---|
| CN | 1728618 | 2/2006 |
| EP | 1662707 | 5/2006 |
| JP | 06170061 | 6/1994 |
| JP | 09168669 | 6/1997 |
| JP | 2000135380 | 5/2000 |
| JP | 2002094395 | 3/2002 |
| JP | 2002-202843 | 7/2002 |
| JP | 3581118 | 7/2004 |

(Continued)

OTHER PUBLICATIONS

Notification of Reason(s) for Refusal dated Nov. 25, 2008, from the corresponding Japanese Application.

(Continued)

Primary Examiner — Sunit Pandya
Assistant Examiner — Shahid Kamal
(74) Attorney, Agent, or Firm — Katten Muchin Rosenman LLP

(57) ABSTRACT

A technology of realizing wireless communication between a parent station and child stations with efficiency. In a game system according to the present invention, a game apparatus sets the maximum number of times of transmission for wireless game controllers, in accordance with the number of wireless game controllers that are communicating at a predetermined communication cycle. Here, time for establishing connection with a new wireless game controller is reserved within each communication cycle, thereby allowing new users to join the game. The maximum number of times of transmission is re-set when the number of wireless game controllers connected changes.

9 Claims, 8 Drawing Sheets

(56) References Cited

FOREIGN PATENT DOCUMENTS

| | | |
|---|---|---|
| JP | 2004329300 | 11/2004 |
| JP | 2005224431 | 8/2005 |
| JP | 2006-49954 | 2/2006 |
| WO | 2005008966 | 1/2005 |

OTHER PUBLICATIONS

Written Amendment dated May 29, 2008, from the corresponding Japanese Application.

IEEE, "Coexistence of Wireless Personal Area Networks With Other Wireless Devices Operating in Unlicensed Frequency Bands", Aug. 28, 2003, pp. 8-10, pp. 13-22, pp. 23-31, New York, NY.

European Search Report and an Annex to the Extended European Search Report dated Sep. 4, 2007, for the corresponding European Patent Application EP 07 25 1734.5-2218.

Notification of Reason(s) for Refusal with dated Jul. 21, 2009, from corresponding Japanese Application JP 2006-126795.

First Office Action dated Aug. 21, 2009 from corresponding Chinese Application CN 200710101873.1.

\* cited by examiner

FIG.5

| NUMBER OF CONNECTED CONTROLLERS | SNIFF ATTEMPT PARAMETER |
|---|---|
| 1 | 4 |
| 2 | 3 |
| 3 | 2 |
| 4 ~ 7 | 1 |

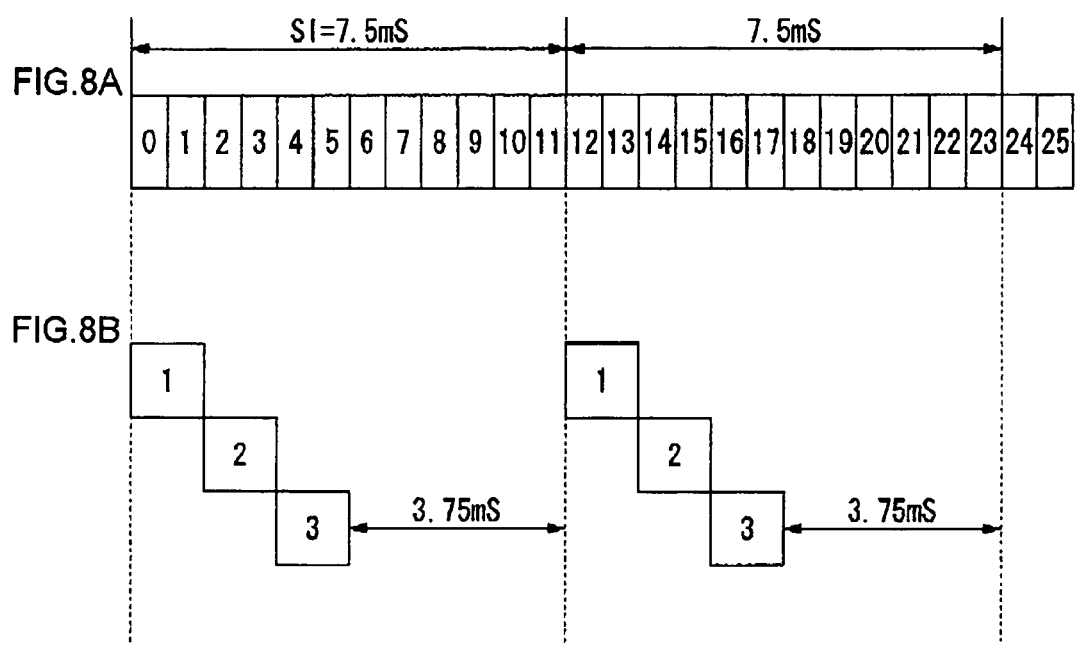

218
GAME APPARATUS, COMMUNICATION APPARATUS, WIRELESS GAME CONTROLLER, AND GAME SYSTEM

BACKGROUND OF THE INVENTION

1. Field of the Invention

The present invention relates to communication technology, and more particularly to a technology for realizing wireless communication between a parent station and a child station.

2. Description of the Related Art

Game apparatuses and game controllers have typically been connected with cables. In some game systems that have been proposed recently, however, game apparatuses and game controllers are connected by wireless means. The use of wireless game controllers makes it possible for users to freely play games from different positions.

The game systems require that operation input data be transmitted from a game controller to a game apparatus at a predetermined communication cycle so that the operation input data from the game controller is reflected in the screen output of the game. In particular, in order to reflect the operation input data in successive frame images, the operation input data must be transmitted from the game controller at intervals shorter than the frame periods of the game image. In addition, if a plurality of game controllers are participating in a game, it is also required that the operation input data from all the game controllers be transmitted to the game apparatus at the predetermined communication cycle.

Wireless communication can easily be affected by the surrounding environment as compared to wired communication, and has a relatively high possibility of failures in data transmission. When adopting wireless game controllers, it is therefore desirable to improve the reliability of the data transmission as much as possible. Moreover, since wireless game controllers run on batteries, it is also necessary to suppress their power consumption.

SUMMARY OF THE INVENTION

In view of the foregoing, it is a general purpose of the present invention to provide a technology for realizing efficient wireless communication between a parent station and a child station.

To solve the foregoing problems, one embodiment of the present invention provides a communication apparatus which performs wireless communication with a plurality of child stations at a predetermined communication cycle. Here, the maximum number of times or maximum time (period, term) available for each individual child station to transmit data is determined in accordance with the number of child stations connected.

Another embodiment of the present invention is a wireless game controller which performs wireless communication with a game apparatus at a predetermined communication cycle. This wireless game controller rereads operation input data from a buffer and transmits it when performing retransmission processing in the same communication cycle, the buffer retaining the latest data.

It should be appreciated that any combinations of the foregoing components, and any conversions of expressions of the present invention between methods, apparatuses, systems, recording media, computer programs, and the like are also intended to constitute applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is a chart showing a correspondence table between the number of controllers connected and a sniff attempt parameter;

FIGS. 8A and 8B are diagrams showing the allocation of time slots according to a modification.

DETAILED DESCRIPTION OF THE INVENTION

The invention will now be described by reference to the preferred embodiments. This does not intend to limit the scope of the present invention, but to exemplify the invention.

Figure 1:
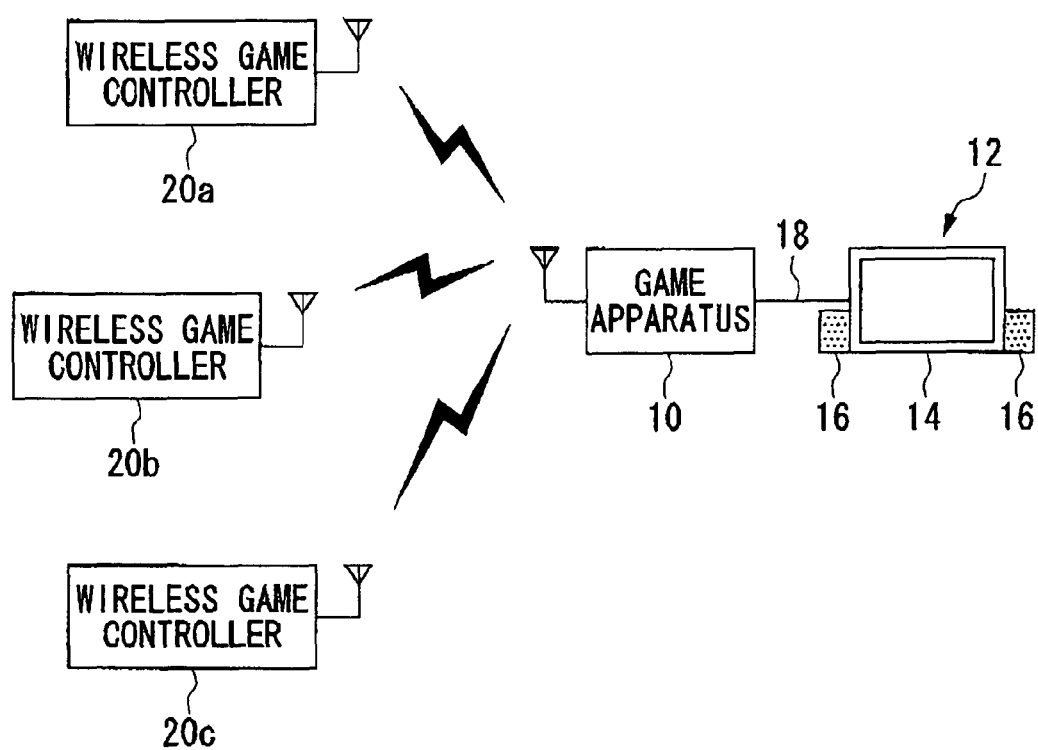
FIG. 1 is a diagram showing the overall configuration of a game system according to an embodiment of the present invention.

FIG. 1 shows the general configuration of a game system 1 according to an embodiment of the present invention. The game system 1 of the present embodiment includes a game apparatus 10, an output apparatus 12, and wireless game controllers 20a, 20b, and 20c (hereinafter, referred to as "wireless game controllers 20" or "wireless game controller 20" if collectively dubbed). It should be noted that while FIG. 1 shows three wireless game controllers 20, the number of wireless game controllers 20 is not intended to be limited to three.

The wireless game controllers 20 are operation input devices for users to make operation inputs from. The game apparatus 10 is a processing unit which processes a game application based on the operation inputs from the wireless game controllers 20, and generates image signals and sound signals that indicate the result of processing of the game application. It should be appreciated that the technology to be described in the present embodiment can also be practiced in entertainment systems that have processing units for executing other types of applications, not necessarily game applications. For a representative example of the entertainment system, description will hereinafter be given of the game system 1 which executes a game application.

The output apparatus 12 includes an image display apparatus 14 and a sound output apparatus 16. The image display apparatus 14 is a display for outputting image signals. It receives image signals generated by the game apparatus 10 through a cable 18, and displays a game screen. The sound output apparatus 16 consists of speakers for outputting sound. It receives sound signals generated by the game apparatus 10 through the cable 18, and outputs game sound.

In the game system 1 shown in FIG. 1, the game apparatus 10 and the output apparatus 12 are wired with the cable 18, whereas they may be connected wirelessly. For example, a home network using a wireless LAN may be constructed between the game apparatus 10 and the output apparatus 12. When the game apparatus 10 and the output apparatus 12 are connected wirelessly, it is possible to locate the game apparatus 10 and the output apparatus 12 at desired sites. This allows users to freely play the game at different locations.

The wireless game controllers 20 are wireless communication terminals which transmit users' operation inputs to the game apparatus 10 by wireless means. The wireless game controllers 20 and the game apparatus 10 perform wireless communication with each other using Bluetooth™ protocols. The game apparatus 10 is capable of communicating wirelessly with a plurality of wireless controllers 20. In other words, the game system 1 can realize one-to-N connection between the game apparatus 10 and the wireless game controllers 20. The game apparatus 10 functions as a parent station or a master. The wireless game controller 20 functions as a child station or a slave.

The wireless game controllers 20 are powered by batteries, and each comprises a plurality of buttons and keys for making operation inputs for game progress. When a user operates the buttons and keys on the wireless game controller 20, the operation input data are transmitted to the game apparatus 10 wirelessly. The game apparatus 10 receives the operation input data pertaining to the game application from the wireless game controllers 20, controls the progress of the game in accordance with the operation input data, and generates game image signals and game sound signals. The game image signals and game sound signals are output to the image display apparatus 14 and the sound output apparatus 16, respectively.

Figure 2:
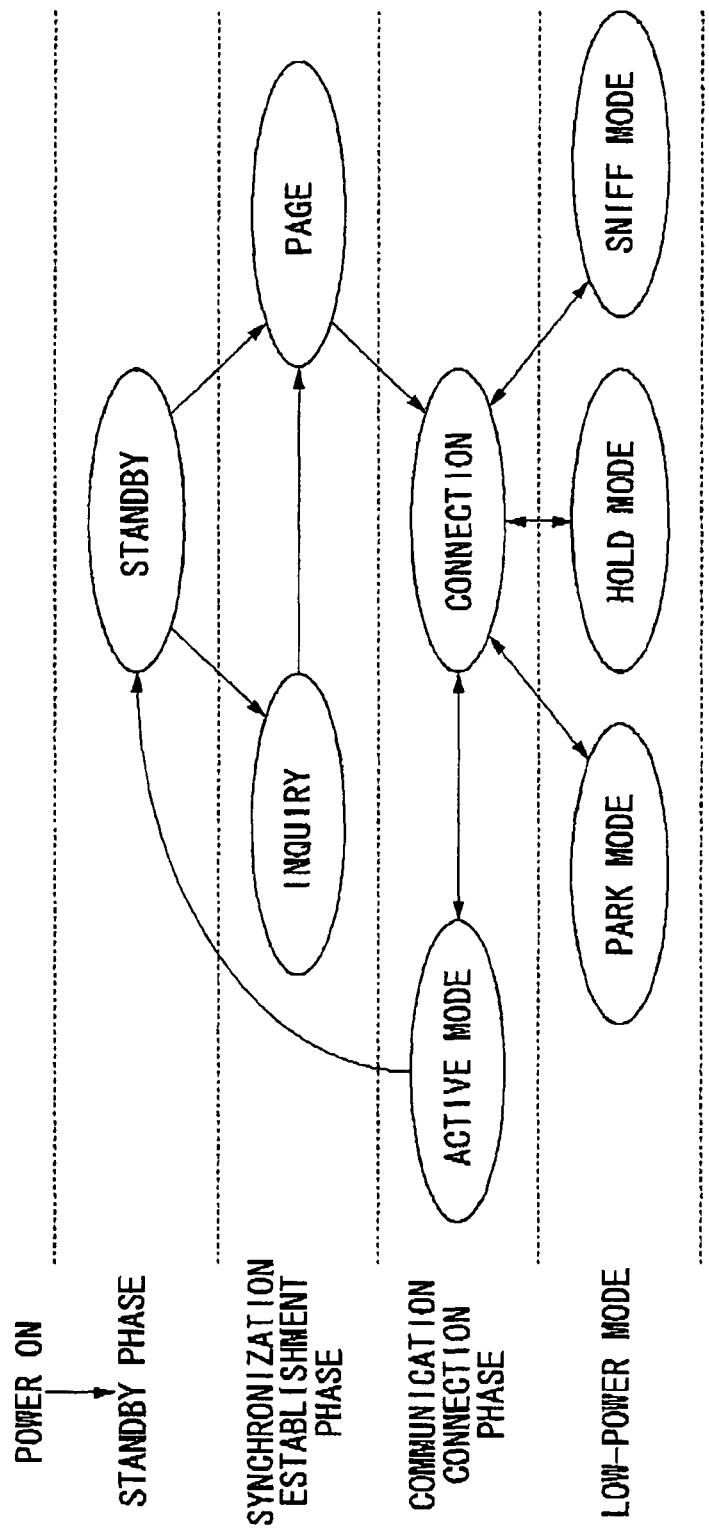
FIG. 2 is a Bluetooth state transition diagram.

FIG. 2 shows a Bluetooth state transition diagram. As shown in the diagram, the possible states of Bluetooth terminals are classified into a standby phase, a synchronization establishment phase, a communication connection phase, and low-power modes.

A slave enters a "standby" state immediately after it is powered on or when its communication link is disconnected. In the "standby" state, no data will be transmitted or received.

The synchronization establishment phase includes: a state where the master inquires about connection of surrounding slave(s), i.e., makes "inquiry", and a state where the master identifies slave(s) and performs "paging". In the "inquiry" state, the master broadcasts an IQ (inquiry) packet to adjacent terminal devices. The slave that receives the IQ packet returns an FHS (Frequency Hop Synchronization) packet including a Bluetooth address and clock information to the master. At this point of transmission and reception, a consensus as to a frequency hopping pattern is yet to be established between the master and the slave. A fixed hopping pattern dedicated and defined for inquiry is therefore used.

In the "page" state, the master receives FHS packets from the slaves, recognizes what kinds of slaves are present, and then transmits an ID packet to a certain slave. When a response to the ID packet is returned from the certain slave, the master transmits an FHS packet and notifies the slave of its clock and a slave identifier. The slave identifier is a 3-bit address (1 to 7) assigned to the slave, and referred to as AM_ADDR (Active Member ADDRess). This makes it possible for the master and the slave to share the same hopping pattern.

Performing "paging", the slave and the master create a piconet therebetween and enter a "connection" state. A piconet refers to a network that is formed temporarily between Bluetooth terminals when they are brought close to each other. Up to eight Bluetooth terminals can join a single piconet. To maintain the synchronization of the piconet, the slave offsets its own clock by a difference from the master clock. In a single piconet, the master can function as a parent station to connect with a maximum of seven slaves. In the "connection" state, control packets for establishing a communication link are transmitted and received to enable data transfer in an "active mode". In the active mode, the slave basically monitors signals transmitted from the master. Since the active slave must remain ready to transmit and receive packets all the time, power consumption of the active slave becomes highest. When a data transfer is completed to disconnect the communication link, the slave returns to the standby state.

In addition to the "active mode", the modes where the communication link is established include a "park mode", a "hold mode" and a "sniff mode". The slave can shift from the "active mode" to the three types of low-power consumption modes, i.e., the "park mode", "hold mode" and "sniff mode". The master can also shift from the "active mode" to the "hold mode".

In the "park mode", the slave remains in synchronization with the piconet, i.e., in synchronization with the hopping pattern and the master clock. However, the slave cannot exchange packets with the master. The slave in this state receives data from the master at a predetermined communication cycle (beacon interval), and can immediately join the piconet when necessary. In the park mode, the slave identifier (AM_ADDR) assigned by the master, i.e., 3-bit address (1 to 7) given to the slave in connection, is once returned to the master. Thus, even if a slave attempts to rejoin the piconet, it cannot join immediately unless there is an unused slave identifier. The master, in the meantime, gives a 8-bit park slave identifier to a slave which enters the park mode. The master can manage up to 255 parked terminal devices, and can allow only required slaves to join the piconet at any time.

In the "hold mode", the slave and the master do not perform transmission or reception for a certain set period of time (hold time) while remaining in synchronization with the piconet. They resume communication after the hold time.

In the "sniff mode", the slave remains in synchronization with the piconet. In order for a slave to enter the sniff mode, the master and the slave negotiate to determine a sniff interval (SI) and a sniff offset. Packets can be transmitted and received only in a sniff slot which is composed of a plurality of time slots within the sniff interval. This allows the slave to suppress power consumption in the period other than the sniff slot. The sniff offset indicates the timing of the first time slot in the sniff slot.

The sniff slot is set by a sniff attempt (SA) parameter. The sniff attempt parameter $N_{SA}$ is used for determining the number of time slots in which the slave accepts packet transmission from the master. The slave monitors packets from the master during the period of the sniff slot which is specified by the sniff attempt parameter $N_{SA}$. For example, if $N_{SA}=3$, the slave monitors its packets and make a response for six time slots which are assigned in the sniff interval. In this case, six consecutive time slots in the sniff interval may be assigned to the sniff slot. Whether packets are addressed to itself or not is determined on the basis of the AM_ADDR included in the packet.

Since the wireless game controllers 20 are powered by batteries, it is preferable to reduce their power consumption as much as possible. The wireless game controllers 20 thus preferably run in the sniff mode. When there are a plurality of wireless game controllers 20, each sniff interval is set in common. Sniff offsets are set so that the respective plurality of wireless game controllers 20 and the game apparatus 10 communicate with each other without temporal overlap. This can realize communications of time divisional multiplexing system.

In the game system 1 of the present embodiment, a wireless game controller 20 performs page processing while the game apparatus 10 is performing page scanning. The wireless game controller 20 thereby pages the game apparatus 10 and establishes connection in the active mode. At this time, the wireless game controller 20 functions as a master, and the game apparatus 10 a slave. The master and the slave then switch in function so that the game apparatus 10 serves as a master and the wireless game controller 20 a slave. In this state, the wireless game controller 20 requests the game apparatus 10 to connect in the sniff mode. Then, the game apparatus 10 notifies the wireless game controller 20 of necessary parameters, and establishes connection in the sniff mode.

Based on the sniff interval and the number of game controllers that are connected to form the piconet, the game apparatus 10 sets the maximum number of times of transmission available for each individual wireless game controller 20 to transmit operation input data. This maximum number of times of transmission is determined by the sniff attempt parameter $N_{SA}$. For example, if $N_{SA}=3$, the wireless game controllers 20 are able to transmit data up to three times each. In the present embodiment, "the maximum number of times of transmission" refers to the maximum number of chances of transmission given within a single communication interval (communication cycle).

Once a wireless game controller 20 successfully transmits data to the game apparatus 10 in its sniff slot, the game apparatus 10 will not transmit a further data transfer request to that wireless game controller 20 in the same sniff slot. It follows that the wireless game controller 20 will not perform data transmission in the rest of the sniff slot period. Suppose, for example, that a sniff slot consisting of six time slots ($N_{SA}=3$) is set. In a favorable wireless environment, data transmission is performed successfully in the first two time slots. No data will thus be transmitted in the remaining four time slots. When the data transmission in the first two time slots fails, conversely, the remaining four time slots can be used for data retransmission processing. It should be noted that the "data retransmission processing" according to the present embodiment merely refers to the transmitting of some data in subsequent time slots within the sniff slot where data transmission has failed in the first two time slots. The data to be transmitted in the subsequent time slots need not necessarily be the same as the transmission-failed data in the first two time slots. Data transmission fails in the first two time slots when the wireless game controller 20 transmits erroneous data or when the data transmitted from the wireless game controller 20 cannot be received by the data apparatus 10, or when the wireless game controller 20 cannot transmit the data itself. In the present embodiment, the game apparatus 10 determines the maximum number of times of transmission for the wireless game controllers 20 connected so that time within the communication cycle can be reserved for establishing connection with a new wireless game controller 20 other than the connected wireless game controllers 20.

The piconet operation involves frequency hopping processing in which a new frequency is selected at every 625 μs. Each single time slot thus has a duration of 625 μs. In the game system 1, the result of processing of the game application is reflected on the output of the image display apparatus 14 which has a rate of 60 frames per second (=16.7 ms). It is therefore desirable that the game apparatus 10 receive operation input data from the wireless game controllers 20 at cycles shorter than 16.7 ms. This setting makes it possible for the game apparatus 10 to reflect the users' operation input data on the outputs of the image display apparatus 14 and the sound output apparatus 16.

For the foregoing reason, the game apparatus 10 sets the sniff interval at 11.25 ms. This sniff interval is equivalent to a period of 18 time slots (625 μs×18). When the game system 1 has a plurality of wireless game controllers 20, the sniff interval is set to be common between the controllers. That is, every wireless game controller 20 performs wireless communication with the game apparatus 10 at the sniff interval of 11.25 ms. It should be appreciated that the sniff interval may have a duration other than 11.25 ms, up to 16.7 ms.

Figure 3:
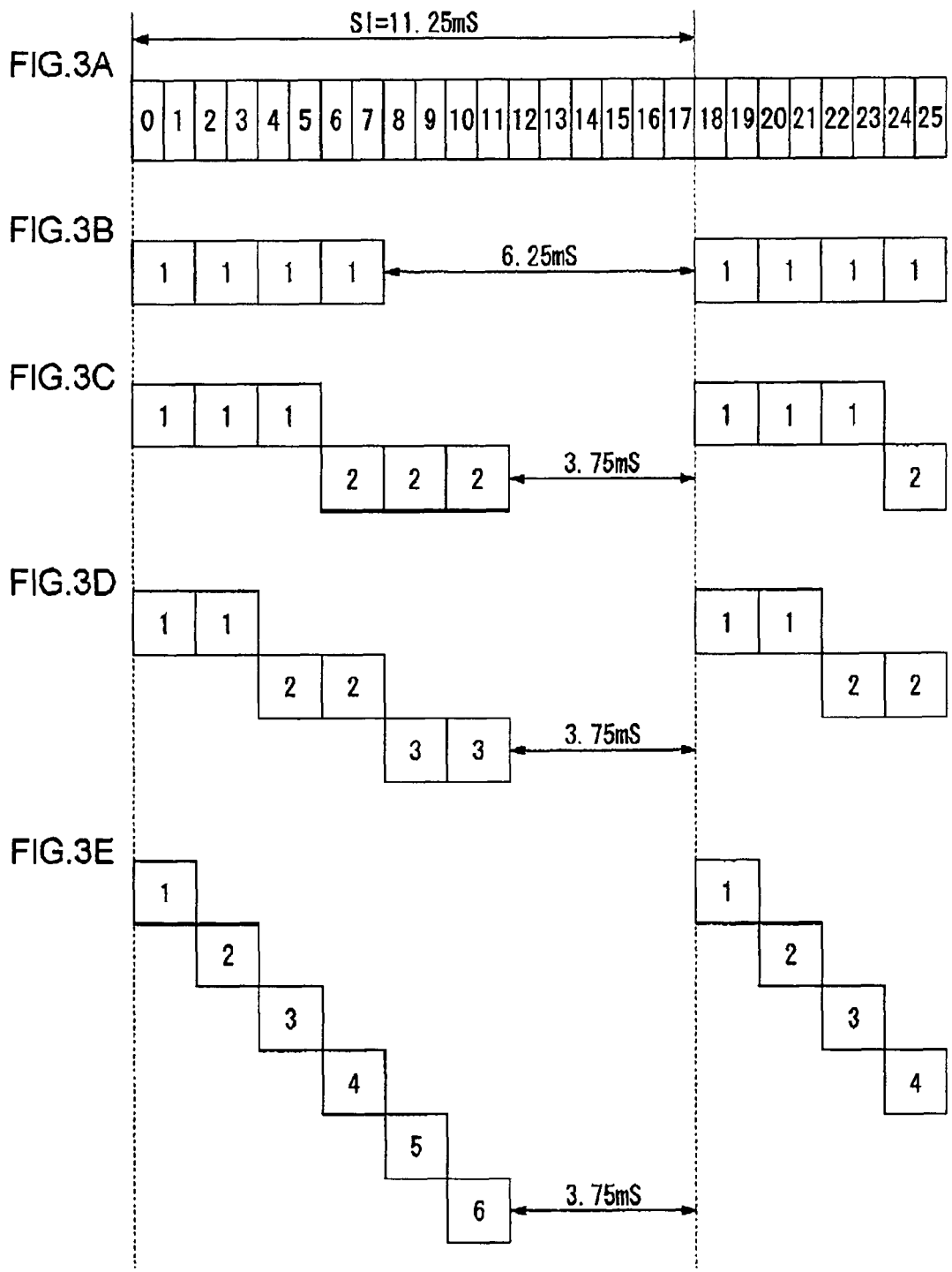
FIGS. 3A to 3E are diagrams showing the allocation of time slots according to the embodiment.

FIGS. 3A to 3E show the allocation of time slots according to the present embodiment. FIG. 3a schematically shows time slots where the sniff interval SI is set to 11.25 ms. Sniff intervals would normally be set between the game apparatus 10 and the respective wireless game controllers 20 separately, and used to control wireless communication of the respective wireless game controllers 20.

In contrast, according to the present embodiment, the game apparatus 10 sets a sniff interval and a sniff attempt parameter $N_{SA}$ which are common among all the wireless game controllers 20 connected. The game apparatus 10 also sets individual sniff offsets so that sniff slots allocated for the respective wireless game controllers 20 do not overlap each other on the time axis. In this way, the game apparatus 10 manages the communicable periods of the wireless game controllers 20 connected in a centralized fashion for appropriate scheduling, thereby facilitating efficient use of the time slots. In the following description, the sniff interval will start at time slot 0 and end at time slot 17 as shown in FIG. 3A.

FIGS. 3B to 3E show sniff slots allocated for wireless game controllers 20. The number of slots in a sniff slot is determined by the sniff attempt parameter $N_{SA}$. The start timing of a sniff slot is determined by a sniff offset.

The numerals shown in FIGS. 3B to 3E indicate the slave identifiers given to the wireless game controllers 20. The numbered time slots show the sniff slots of the respective wireless game controllers 20 having those slave identifiers. In Bluetooth communication, the game apparatus 10 sends a data transfer request to a certain wireless game controller 20, and that wireless game controller 20 transfers data in response. Since a single data transfer can be performed in two time slots in this way, FIGS. 3B to 3E show every two time slots as a single communication time.

It is also known that Bluetooth communication requires approximately six time slots (3.75 ms) for page processing. For this reason, the game apparatus 10 reserves at least six time slots in a sniff interval for the purpose of page scanning, and allocates the remaining 12 time slots as sniff slots. As mentioned above, when the game apparatus 10 and a new wireless game controller 20 are establishing communication, the game apparatus 10 functions as a slave to perform page scanning while the wireless game controller functions as a master to perform page processing.

FIG. 3B shows the allocation of time slots when the game system 1 includes one wireless game controller 20. If there is one wireless game controller 20, the sniff attempt parameter $N_{SA}$ is 4. The sniff slot is thus set to eight time slots. This wireless game controller 20 transfers operation input data in the first two time slots. Ideally, the game apparatus 10 transmits a data transfer request to the wireless game controller 20 at time slot 0, and the wireless game controller 20 transmits the operation input data to the game apparatus 10 at time slot 1. The game apparatus 10 receives this operation input data to complete the communication. In this way, the communication is ideally completed in two time slots, whereas retransmission processing is performed up to three times subsequently if the data transfer fails.

For example, if the wireless game controller 20 fails to receive the data transfer request from the game apparatus 10 at time slot 0, the wireless game controller 20 cannot transfer data at time slot 1. Since the game apparatus 10 cannot receive data at time slot 1, it performs retransmission processing to send a data transfer request again at time slot 2. When the wireless game controller 20 receives the data transfer request, it transfers data at time slot 3 and the game apparatus 10 receives the transferred data. In this case, the communication is completed at time slot 3. The wireless game controller 20 subsequently monitors signals from the game apparatus 10 up to time slot 7, and stops monitoring signals at time slot 8 to enter a power-saving state. The retransmission processing is repeated up to time slot 7 unless the game apparatus 10 receives data successfully. Even if the data cannot be received by time slot 7, the wireless game controller 20 stops monitoring signals and enters the power-saving mode at time slot 8.

If the data transferred from the wireless game controller 20 at time slot 1 contains any error, or if the game apparatus 10 fails to receive the transferred data, the game apparatus 10 returns a NACK signal to the wireless game controller 20 at time slot 2. This NACK signal indicates that the data cannot be received normally, and requires data retransmission. Subsequently, the retransmission processing is repeated up to the limit of time slot 7. Receiving the operation input data successfully through the retransmission processing of the wireless game controller 20, the game apparatus 10 stops transmitting the request for the transfer of the operation input data to the wireless game controller 20 in that communication cycle.

As noted above, when there is one wireless game controller 20, the sniff attempt parameter $N_{SA}$ is set to 4. This setting makes it possible to reserve six time slots (3.75 ms) for page scanning, with the maximum number of times of transmission being four. In the example of FIG. 3B, ten time slots (6.25 ms) are reserved.

FIG. 3C shows the allocation of time slots when the game system 1 includes two wireless game controllers 20. If there are two wireless game controllers 20, the sniff attempt parameter $N_{SA}$ is 3. The sniff slots are thus set to six time slots each.

The sniff slot of the wireless game controller 20 that has the slave identifier 1 is allocated to time slots 0 to 5. The sniff slot of the wireless game controller 20 having the slave identifier 2 is allocated to time slots 6 to 11. When there are two wireless game controllers 20, the sniff attempt parameter $N_{SA}$ is set to 3. This setting makes it possible to reserve six time slots (3.75 ms) for page scanning, with the maximum number of times of transmission being three.

FIG. 3D shows the allocation of time slots when the game system 1 includes three wireless game controllers 20. If there are three wireless game controllers 20, the sniff attempt parameter $N_{SA}$ is 2. The sniff slots are thus set to four time slots each.

The sniff slot of the wireless game controller 20 having the slave identifier 1 is allocated to time slots 0 to 3. The sniff slot of the wireless game controller 20 having the slave identifier 2 is allocated to time slots 4 to 7. The sniff slot of the wireless game controller 20 having the slave identifier 3 is allocated to time slots 8 to 11. When there are three wireless game controllers 20, the sniff attempt parameter $N_{SA}$ is set to 2. This setting makes it possible to reserve six time slots (3.75 ms) for page scanning, with the maximum number of times of transmission being 2.

When the game system 1 contains four or more wireless game controllers 20, the maximum number of times of transmission is set to one, i.e., no retransmission processing is allowed within the sniff interval of 11.25 ms. For example, if four controllers were given a maximum number of times of transmission of two, the communication time required would be 16 time slots (=four time slots×four controllers). It follows that only two time slots could be allocated for page scanning, which precludes page scanning. It should be appreciated that, even in this case, a single retransmission may be allowed if the game application has no possibility of connecting another wireless game controller 20.

With five or more controllers, the communication time itself exceeds the sniff interval if the maximum number of times of transmission is set to two. For this reason, if there are four or more wireless game controllers 20, the sniff attempt parameter $N_{SA}$ is 1 so that the sniff slots are set to two time slots each.

FIG. 3E shows the allocation of time slots when the game system 1 includes six wireless game controllers 20. The sniff slot of the wireless game controller 20 having the slave identifier 1 is allocated to time slots 0 and 1. The sniff slot of the wireless game controller 20 having the slave identifier 2 is allocated to time slots 2 and 3. The sniff slot of the wireless game controller 20 having the slave identifier 3 is allocated to time slots 4 and 5. The sniff slot of the wireless game controller 20 having the slave identifier 4 is allocated to time slots 6 and 7. The sniff slot of the wireless game controller 20 having the slave identifier 5 is allocated to time slots 8 and 9. The sniff slot of the wireless game controller 20 having the slave identifier 6 is allocated to time slots 10 and 11. When there are six wireless game controllers 20, the sniff attempt parameter $N_{SA}$ is set to 1. This setting makes it possible to reserve six time slots (3.75 ms) for page scanning, with the maximum number of times of transmission being one.

Since the maximum number of wireless game controller 20 connectable to the game apparatus 10 is seven, it is unnecessary to allocate time slots for page scanning when seven controllers are connected.

Figure 4:
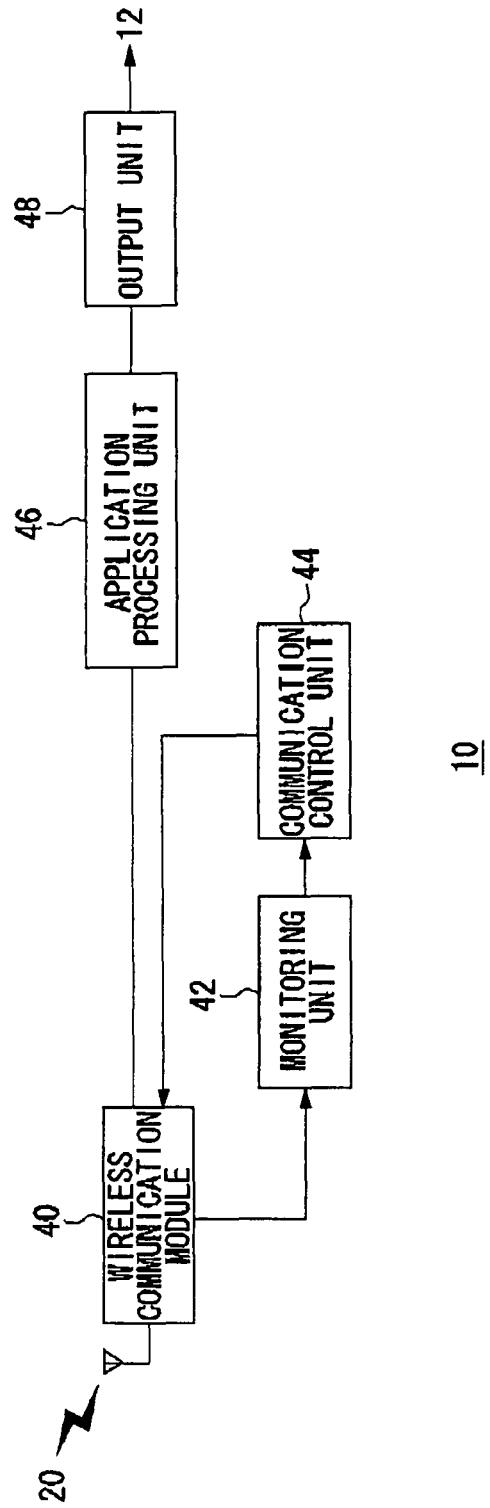
FIG. 4 is a diagram showing the configuration of a game apparatus.

FIG. 4 shows the configuration of the game apparatus 10. The game apparatus 10 includes a wireless communication module 40, a monitoring unit 42, a communication control unit 44, an application processing unit 46, and an output unit 48. The processing functions of the game apparatus 10 in the present embodiment are realized by a CPU, a memory, a program loaded into the memory, and the like, whereas this diagram shows functional blocks to be achieved by cooperation of those elements. The program may be built into the game apparatus 10, or may be supplied on an external recording medium. It will thus be understood by those skilled in the art that these functional blocks may be achieved in various forms including hardware alone, software alone, and a combination of these. In the example shown, the CPU of the game apparatus 10 realizes the functions of the monitoring unit 42, the communication control unit 44, and the application processing unit 46.

The wireless communication module 40 establishes wireless communication with wireless game controllers 20 using Bluetooth protocols. The wireless communication module 40 manages the wireless game controllers 20 that are connected to the piconet. The monitoring unit 42 monitors the number of wireless game controllers 20 connected. For example, the monitoring unit 42 may inquire of the wireless communication module 40 how many controllers are connected to the piconet, at predetermined monitoring cycles. The wireless communication module 40 may notify the monitoring unit 42 of the latest number of controllers connected to the piconet when the number of controllers connected changes. The monitoring unit 42 sends the number of controllers connected to the piconet to the communication control unit 44.

The communication control unit 44 sets the maximum number of times for operation input data to be transmitted from each individual wireless game controller 20 in accordance with the set communication cycle (sniff interval) and the number of wireless game controllers 20 connected. The sniff interval is previously set by the game system 1, and is notified from the wireless communication module 40 to the communication control unit 44. Take the case where the sniff interval is 11.25 ms. If one controller is connected, the maximum number of times of transmission is set to four. If two, the maximum number of times of transmission is set to three. If three, the maximum number of times of transmission is set to two. If four or more, the maximum number of times of transmission is set to one. Specifically, the maximum number of times of transmission is set depending on the sniff attempt parameter. Reserving time for page scanning can ensure that there are opportunities for new wireless game controllers 20 to connect to the piconet so that new users can join in the game application in progress.

In the present embodiment, the sniff interval has a fixed value and the communication control unit 44 retains a table which associates the numbers of controllers connected with respective sniff attempt parameters.

FIG. 5 shows the correspondence table between the number of controllers connected and the sniff attempt parameter. If one controller is connected, the sniff attempt parameter is set to four. If two controllers are connected, the sniff attempt parameter is set to three. If three controllers are connected, the sniff attempt parameter is set to two. If four or more controllers are connected, the sniff attempt parameter is set to one.

The communication control unit 44 acquires the slave identifiers (AM_ADDR) of the wireless game controllers 20 connected to the piconet through the monitoring unit 42. Based on these slave identifiers, the communication control unit 44 sets the sniff offsets for the respective wireless game controllers 20. Description will now be given in conjunction with the time slots shown in FIG. 3C.

Suppose, for example, that two controllers are connected. For the wireless game controller 20a which has the slave identifier of 1, the communication control unit 44 sets the sniff offset to zero. For the wireless game controller 20b having the slave identifier of 2, it sets the sniff offset to six according to the sniff attempt parameter. Consequently, the sniff slot of the wireless game controller 20a having the slave identifier 1 can be set to time slots 0 to 5, and the sniff slot of the wireless game controller 20b having the slave identifier 2 can be set to time slots 6 to 11. The sniff offsets and the sniff slots of the respective wireless game controllers 20 are transferred to the wireless communication module 40.

The wireless communication module 40 notifies these sniff offsets, the sniff slots, and the sniff interval to the wireless game controllers 20. As a result, the wireless game controllers 20 can learn their respective sniff slots for monitoring packets from the game apparatus 10, and can thus enter the power-saving state when not in those sniff slots.

The wireless communication module 40 transmits a data transfer request to a wireless game controller 20, and receives operation input data that is transmitted from the wireless game controller 20 in response to that data transfer request. When the wireless communication module 40 successfully receives operation input data transmitted from the wireless game controller 20 during the sniff slot of the wireless game controller 20, it stops transmitting a request for the transfer of operation input data to the wireless game controller 20 in the same sniff slot. This can prevent the wireless game controller 20 from retransmitting data within the same sniff slot, thereby suppressing the power consumption. If the wireless communication module 40 fails to receive the operation input data from the wireless game controller 20, conversely, it transmits a request for the transfer of operation input data to that wireless game controller 20 within the same sniff slot. Consequently, the wireless game controller 20 can perform the processing of retransmitting operation input data.

Figure 6:
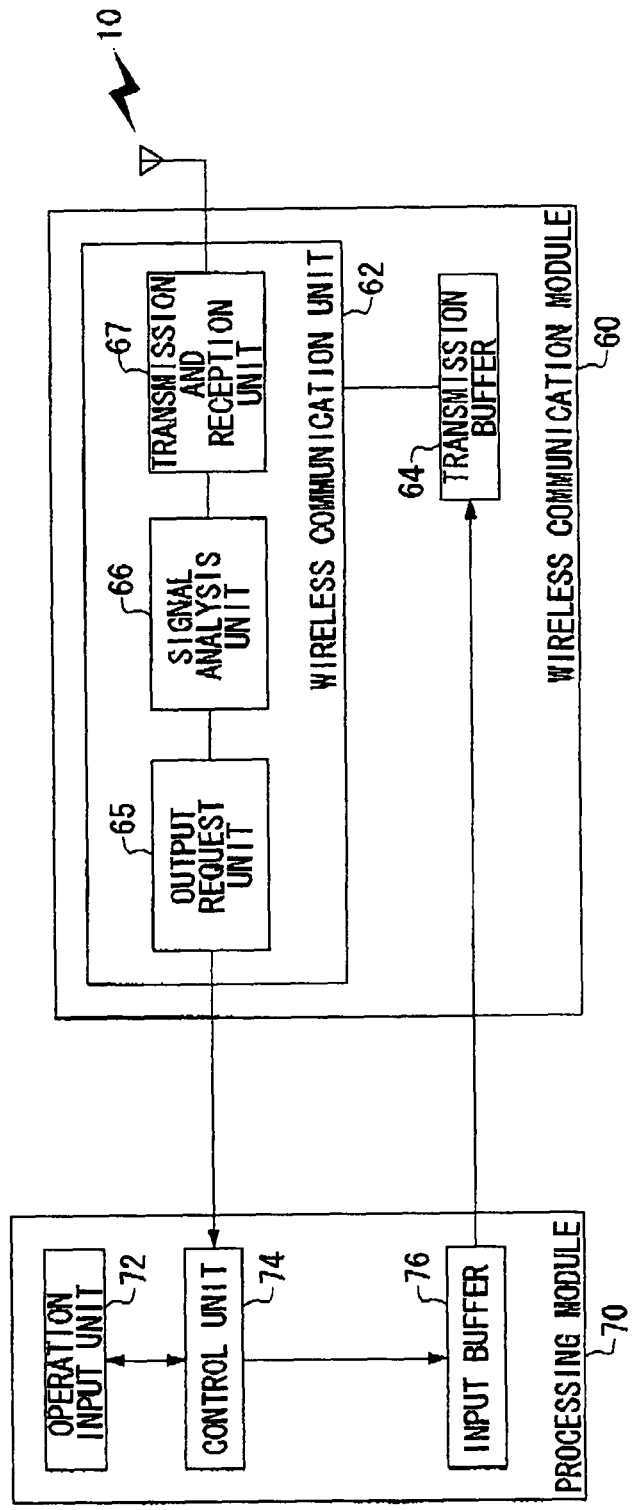
FIG. 6 is a diagram showing the configuration of a wireless game controller.

FIG. 6 shows the configuration of the wireless game controllers 20. A wireless game controller 20 includes a wireless communication module 60 and a processing module 70. The wireless communication module 60 has a wireless communication unit 62 and a transmission buffer 64. The processing module 70 has an operation input unit 72, a control unit 74, and an input buffer 76. The wireless communication unit 62 includes an output request unit 65, a signal analysis unit 66, and a transmission and reception unit 67.

In the processing module 70, the operation input unit 72 is composed of such components as an arrow key, an analog stick, and operation buttons which are formed on the case of the wireless game controller. A user can operate the operation input unit 72 to make operation inputs on the game application. The input buffer 76 retains operation input data that is input from the operation input unit 72. The control unit 74 monitors the operation input unit 72 for input information at a predetermined sampling speed, and overwrites the input buffer 76 with the latest operation input data when the user makes any game operation.

In the wireless communication module 60, the transmission buffer 64 retains data to be transmitted. The transmission and reception unit 67 is provided with the settings of the sniff interval and the sniff attempt parameter $N_{SA}$ from the game apparatus 10. This determines the maximum number of times of data transmission in the sniff interval, so that the transmission and reception unit 67 can perform retransmission processing based on this maximum number of times of transmission. When the transmission and reception unit 67 receives a data transfer request from the game apparatus 10, it transmits the data retained in the transmission buffer 64 within the set maximum number of times of transmission.

Specifically, a packet signal received by the transmission and reception unit 67 is supplied to the signal analysis unit 66. The signal analysis unit 66 refers to AM_ADDR in the packet and determines whether or not the packet signal received is addressed to its own controller. If the signal is addressed to its own controller, the signal analysis unit 66 determines whether or not the signal is a data transfer request. If it is a data transfer request, the signal analysis unit 66 instructs the output request unit 65 to generate a request for the output of operation input data. Receiving the instruction to generate, the output request unit 65 generates a request for the output of operation input data and supplies it to the control unit 74.

Receiving the output request, the control unit 74 sends the latest operation input data stored in the input buffer 76 to the transmission buffer 64. The transmission buffer 64 is overwritten with and stores the latest operation input data supplied from the input buffer 76. At the next time slot, the transmission and reception unit 67 reads and transmits the operation input data stored in the transmission buffer 64.

If the transmission and reception unit 67 fails to transmit the operation input data to the game apparatus 10 and receives a data retransmission request from the game apparatus 10 in the same sniff interval, the output request unit 65 resupplies the output request to the control unit 74 by the foregoing procedure. The control unit 74 supplies the operation input data from the input buffer 76 to the transmission buffer 64 in accordance with the resupplied output request. In this way, the transmission and reception unit 67 retransmits, to the game apparatus 10, the operation input data that is resupplied to the transmission buffer 64 within the same sniff interval.

The control unit 74 monitors the operation input unit 72 for an operation input at a sampling speed faster than the intervals at which the transmission and reception unit 67 transmits operation input data to the game apparatus 10, and overwrites the input buffer 76 successively if there is any operation input. Consequently, in the input buffer 76, operation input data that has failed in data transmission may sometimes be replaced with new operation input data by the time of retransmission. In other words, since the latest operation input data retained in the input buffer 76 is transmitted instead of the operation input data that has already been retained in the transmission buffer 64, it is possible to reflect user's operation inputs on the game application in real time.

The operation input data transmitted from the wireless game controller 20 are received by the wireless communication module 40 and then supplied to the application processing unit 46. The application processing unit 46 processes game data based on the operation input data from the user, and generates game AV data. The game AV data is supplied from the output unit 48 to the output apparatus 12. As a result, the image display apparatus 14 and the sound output apparatus 16 output images and sound on which the user's game operation inputs are reflected.

Figure 7:
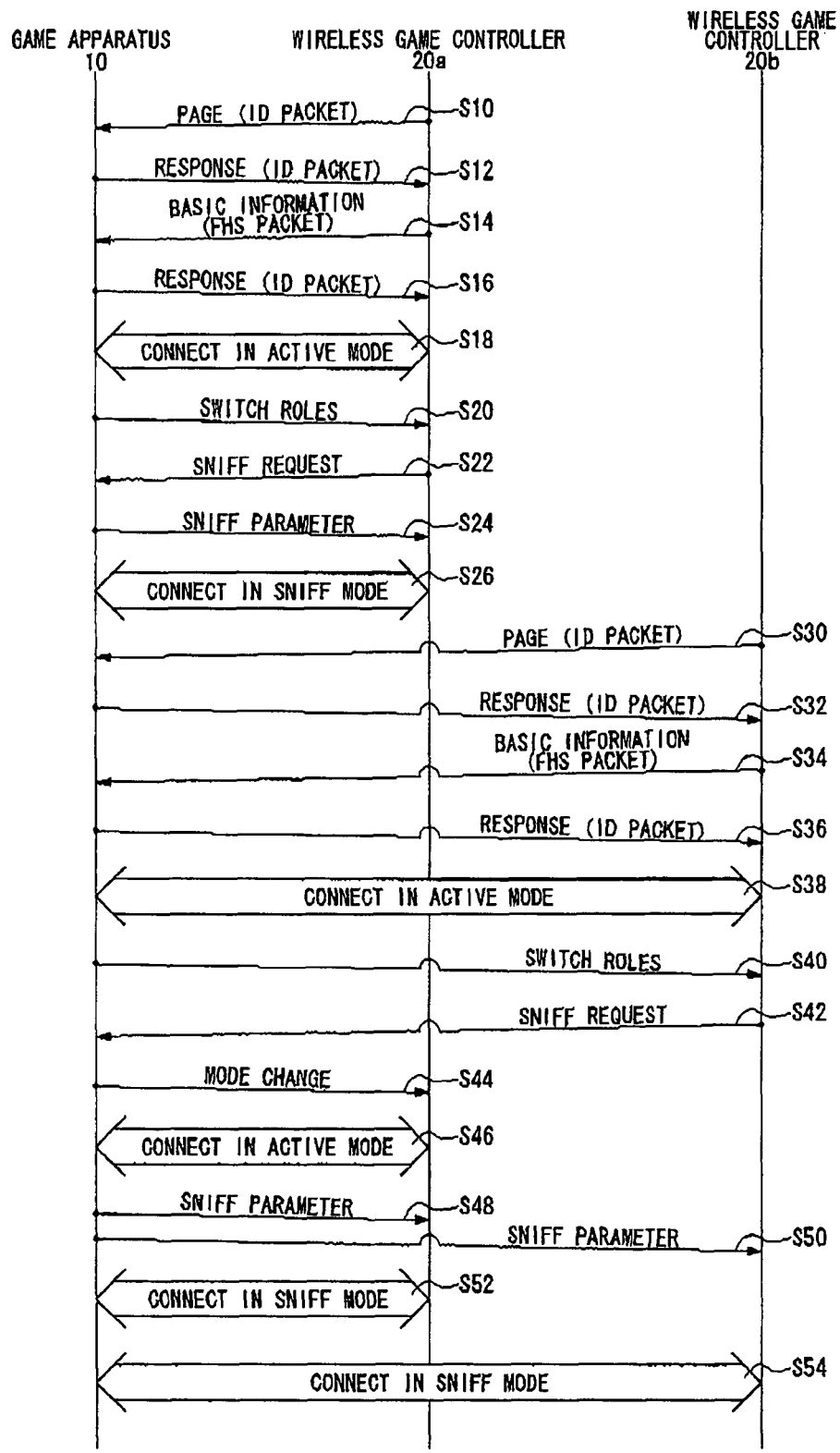
FIG. 7 is a diagram showing a connection sequence between the game apparatus and wireless game controllers in a sniff mode.

FIG. 7 shows a connection sequence between the game apparatus 10 and wireless game controllers 20. The wireless game controller 20a functions as a master to perform page processing on the game apparatus 10, which is executing page scanning, by using an ID packet (S10). Receiving the ID packet, the game apparatus 10 returns an ID packet that notifies of the reception of the page (S12). The wireless game controller 20a transmits an FHS packet that contains basic information regarding the communication to the game apparatus 10 (S14). The game apparatus 10 returns an ID packet that notifies of the reception of the FHS packet (S16), and the two terminals are connected to each other in the active mode (S18).

The game apparatus 10 then transmits a switch signal to the wireless game controller 20a for switching the roles of the master and the slave (S20). This makes the game apparatus 10 a master and the wireless game controller 20a a slave. At this point, the game apparatus 10 provides the wireless game controller 20a with a slave identifier (AM_ADDR) in the piconet where it serves as the master. The wireless game controller 20a transmits a request for a shift into the sniff mode to the game apparatus 10 (S22). The game apparatus 10 transmits a parameter set, including the sniff interval, the sniff offset, and the sniff attempt parameter, to the wireless game controller 20a (S24). This connects the two terminals in the sniff mode (S26). When only one controller is connected, the maximum number of times of transmission is set to four.

Description will now be given of a sequence where one wireless game controller 20a is thus in connection with the game apparatus 10 in the sniff mode when another wireless game controller 20b joins this piconet.

The wireless game controller 20b functions as a master to perform page processing on the game apparatus 10, which is executing page scanning, by using an ID packet (S30). The game apparatus 10 is executing page scanning in the time slots of the sniff interval where no sniff slot is set. Receiving the ID packet, the game apparatus 10 returns an ID packet that notifies of the reception of the page (S32). The wireless game controller 20b transmits an FHS packet that contains basic information regarding the communication to the game apparatus 10 (S34). The game apparatus returns an ID packet that notifies of the reception of the FHS packet (S36), and the two terminals are connected to each other in the active mode (S38).

The game apparatus 10 transmits a switch signal to the wireless game controller 20b for switching the roles of the master and the slave (S40). This makes the gate apparatus 10 a master and the wireless game controller 20b a slave. The game apparatus 10 provides the wireless game controller 20b with a slave identifier (AM_ADDR) in its own piconet. Consequently, the wireless game controllers 20a and 20b are connected as slaves to this piconet. The wireless game controller 20b transmits a request for a shift into the sniff mode to the game apparatus 10 (S42). The game apparatus 10 transmits a mode change request to the wireless game controller 20a which is connected in the sniff mode (S44). As a result, the connection between the game apparatus 10 and the wireless game controller 20a returns to the active mode (S46).

The game apparatus 10 sets the sniff offsets of the respective wireless game controllers 20 and the sniff attempt parameter in accordance with the number of wireless game controllers 20 connected to the piconet. The game apparatus 10 transmits a parameter set including the sniff interval, a sniff offset, and the sniff attempt parameter to the wireless game controller 20a (S48). The game apparatus 10 also transmits a parameter set including the sniff interval, a sniff offset, and the sniff attempt parameter to the wireless game controller 20b (S50). This reconnects the game apparatus 10 with the wireless game controller 20a in the sniff mode (S52), and connects the game apparatus 10 with the wireless game controller 20b in the sniff mode (S54). When two controllers are connected, the maximum number of times of transmission is set to three. As above, when the number of connected wireless game controllers 20 changes, the game apparatus 10 can re-set the maximum number of times of transmission. This processing is performed by the communication control unit 44.

The sequence diagram shown in FIG. 7 shows the case where the wireless game controllers 20 join a piconet. When a wireless game controller 20 leaves the piconet, the wireless game controller 20 transmits a link disconnection request to the game apparatus 10. The game apparatus 10 disconnects the communication link with the wireless game controller 20, and sets the remaining wireless game controller(s) 20 connected in the sniff mode to the active mode. At this time, the game apparatus 10 re-sets the sniff offset and the sniff attempt parameter with respect to each wireless game controller 20, and notifies them to each controller so as to restart connection in the sniff mode.

Even if the number of wireless game controllers 20 in the piconet changes, connections that have already been established in the sniff mode need not be changed unless the sniff attempt parameter changes. Take, for example, the case where six wireless game controllers 20 are already connected to the game apparatus 10, and another wireless game controller 20 joins or one of the wireless game controllers 20 leaves. Since the sniff attempt parameter is unchanged, it is only necessary to process the joining or leaving wireless game controller 20 without disconnecting the existing connections in the sniff mode or returning to the active mode.

The embodiment has adopted a Bluetooth protocol based communication system. Bluetooth protocols can realize communications that are temporally managed in units of time slots for precise scheduling. The sniff interval can thus be maintained even if the maximum number of times of communication is manipulated as the parameter for controlling retransmission processing.

The communication control technology of the present embodiment may also be applied to other communication systems. For example, it may be applied to wireless communication systems on IEEE 802.11 protocols, in which case the wireless game controllers 20 may be configured as IEEE 802.11 terminals. In the communication environment on IEEE 802.11 protocols, the game apparatus 10 functions as a coordinator. Wireless LANs on IEEE 802.11 protocols use the technology of CSMA/CA (Carrier Sense Multiple Access with Collision Avoidance) as an access control method in the MAC layer. IEEE 802.11 terminals are provided with the function of checking whether a communication channel is idle for more than a certain period of time before data transmission. This latency is a minimum necessary time plus a random duration of waiting time that is determined for each individual terminal. This prevents a plurality of terminals from performing transmission concurrently after the lapse of a certain time interval since the previous communication, thereby causing a collision between signals.

In the wireless communication using IEEE 802.11 protocols, the number of times of retransmission can be set in accordance with TCP/IP. If the retransmission control is performed based an the set number of times of retransmission alone, however, unfavorable situations can occur such that the retransmission control is continued beyond a beacon interval with adverse effects on the communication of other wireless game controllers 20.

The game apparatus 10, an IEEE 802.11 terminal, therefore performs wireless communication with at least one wireless game controller 20 at predetermined beacon intervals. Based on the beacon interval and the number of connected wireless game controllers 20, the game apparatus 10 also sets a maximum transmission time for each of the wireless game controllers 20. This maximum transmission time is preferably set so as to reserve time necessary for a new wireless game controller 20 to connect to the game apparatus 10. The communication control unit 44 re-sets the maximum transmission time when the number of connected wireless game controllers 20 changes.

If a plurality of wireless game controllers 20 is present, the maximum transmission time is allocated to each individual controller within the beacon interval so as not to overlap each other. If a wireless game controller 20 fails in data transmission, it performs retransmission processing within the set maximum transmission time. When the set maximum transmission time elapses, the retransmission processing is terminated at that point in time. In this way, the maximum transmission time can be used to perform timeout processing for the sake of efficient retransmission processing.

The present embodiment has dealt with the case where the maximum number of times of transmission or the maximum transmission time of operation input data is set in accordance with the communication cycle and the number of connected wireless game controllers 20, so as to be common among all the wireless game controllers 20. Alternatively, the maximum number of times of transmission or the maximum transmission time may be set with respect to each of the wireless game controllers 20 separately.

Suppose, for example, that two wireless game controllers 20a and 20b are in connection with the game apparatus 10, and the communication environment of the wireless game controller 20a is significantly poorer than that of the wireless game controller 20b. Then, the maximum number of times of transmission of the wireless game controller 20a may be set to four while that of the wireless game controller 20b is set to two. For example, the monitoring unit 42 may grasp the communication environments where the respective wireless game controllers 20 are in, based on signal reception intensities measured by the wireless communication module 40. Instead of using the signal reception intensities, the communication environments may also be estimated, for example, based on the error rates of data transferred from the respective wireless game controllers 20. When the communication environments are thus monitored or estimated and the maximum numbers of times of transmission from wireless game controllers 20 in a poor communication environment are made higher than those from the other wireless game controllers 20, it is possible to improve the communication efficiency of the entire game system 1. While the foregoing has dealt with setting the maximum numbers of times of transmission in Bluetooth communication, the same also applies to setting the maximum transmission times in IEEE 802.11 communication.

Up to this point, the present invention has been described in conjunction with the embodiment thereof. This embodiment is given solely by way of illustration. It will be understood by those skilled in the art that various modifications may be made to combinations of the foregoing components and processes, and all such modifications are also intended to fall within the scope of the present invention. While the embodiment has dealt with the case where the communications are made by using a single communication method, communications may also be made by a plurality of communication methods at common communication cycles. For example, in FIGS. 3B to 3E, the game apparatus 10 may access IEEE 802.11 terminals in time periods where no sniff slot is allocated. Implementing the game apparatus 10 with a plurality of communication methods can provide a game system 1 of higher versatility.

The embodiment has dealt with the technology of setting the maximum number of times of transmission or the maximum transmission time of operation input data in accordance with the number of connected wireless game controllers 20, assuming that the communication cycles such as the sniff interval and the beacon interval are invariable. Hereinafter, description will be given of a technology which improves the reliability of data transfer by providing variable communication cycles.

FIGS. 8A and 8B show the allocation of time slots according to a modification. FIG. 8A schematically shows time slots. FIG. 8B shows the allocation of time slots when the game system 1 includes three wireless game controllers 20.

In this modification, the communication control unit 44 determines the communication cycle based on the number of wireless game controllers 20 connected. Note that this communication cycle is always set to be shorter than the frame time (16.7 ms) of the game screen. According to this modification, the wireless game controllers 20 connected are not allowed to perform retransmission processing. That is, the wireless game controllers 20 are given only a single opportunity of data transmission in the communication cycle. The sniff slot of each of the wireless game controllers 20 is thus composed of two time slots.

The communication control unit 44 determines the communication cycle based on the time required for communicating with the connected wireless game controllers 20 and the time required for establishing connection with a new wireless game controller 20 other than those already connected. The time required for establishing connection with a new wireless game controller 20 is six time slots, and the time required for communicating with the three wireless game controllers 20 is six time slots. Consequently, the sniff interval is set to a total of 12 time slots.

As above, the sniff interval is set to be extremely short, consisting of the minimum number of time slots necessary for communication and the minimum number of time slots necessary for page scanning. This setting can provide opportunities for immediate data transmission in the next sniff interval even if data transfer fails. It is therefore possible to maintain the real-time response of the game application without retransmission processing. It should be appreciated that the communication control unit 44 re-sets the communication cycle when the number of connected wireless game controllers 20 changes.

What is claimed is:

1. A game apparatus which performs wireless communication in a predetermined communication cycle with at least one wireless game controller which transmits operation input data, the game apparatus comprising:
   a monitoring unit which monitors the number of wireless game controllers connected; and
   a communication control unit which sets a maximum number of times of transmission or maximum transmission time available within a duration of one communication cycle for each individual wireless game controller to transmit operation input data, in accordance with the communication cycle and the number of wireless game controllers connected.

2. The game apparatus according to claim 1, wherein the communication control unit sets the maximum number of times of transmission or the maximum transmission time of the operation input data from the wireless game controller while reserving time for establishing connection with a new wireless game controller other than the connected wireless game controller within the communication cycle.

3. The game apparatus according to claim 1, wherein the communication control unit re-sets the maximum number of times of transmission or the maximum transmission time when the number of wireless game controllers connected changes.

4. The game apparatus according to claim 1, further comprising a wireless communication device which transmits a data transfer request to the wireless game controller and receives operation input data transmitted from the wireless game controller, and wherein
   after the wireless communication device successfully receives the operation input data transmitted from the wireless game controller within a maximum number of times of transmission or the maximum transmission time set by the communication control unit, it does not retransmit a data transfer request to the wireless game controller in the same communication cycle.

5. A game system comprising a game apparatus and at least one wireless game controller which perform wireless communication with each other in a predetermined communication cycle, wherein:
   the wireless game controller has the function of transmitting operation input data in response to a data transfer request from the game apparatus; and
   the game apparatus includes
      a monitoring unit which monitors the number of wireless game controllers connected, and
      a communication control unit which sets a maximum number of times of transmission or maximum transmission time available within a duration of one communication cycle for each individual wireless game controller to transmit operation input data, in accordance with the communication cycle and the number of wireless game controllers connected.

6. A wireless game controller which performs wireless communication with a game apparatus in accordance with a predetermined communication cycle, the wireless game controller comprising a wireless communication device and a processing device,
   the wireless communication device including
      a transmission buffer which retains data to be transmitted, and
      a wireless communication unit which transmits the data, retained in the transmission buffer, within a maximum number of times of transmission or maximum transmission time in a duration of one communication cycle when the wireless communication unit receives a data transfer request from the game apparatus, the communication cycle and the maximum number of times of transmission or maximum transmission time being set by the game apparatus,
   the processing device including
      an operation input unit from which a user makes a game operation,
      an input buffer which retains operation input data input from the operation input unit, and
      a control unit which overwrites operation input data to the input buffer when a game operation is made by the user,
   the wireless communication unit supplying the control unit with a request for output of the operation input data when the wireless communication unit receives the data transfer request from the game apparatus,
   the control unit supplying the transmission buffer with the operation input data retained in the input buffer when the control unit receives the request for output,
   the wireless communication unit transmitting, to the game apparatus, the operation input data that is supplied from the input buffer to the transmission buffer, and wherein
   when the wireless communication unit receives a data retransmission request from the game apparatus within the same communication cycle, the wireless communication unit resupplies the control unit with a request for output and retransmits, to the game apparatus, the operation input data that is supplied from the input buffer to the transmission buffer in response to the output request resupplied.

7. The wireless game controller according to claim 6, wherein the control unit monitors an operation input from the operation input unit at sampling speed faster than an interval at which the wireless communication unit transmits the operation input data.

8. A communication apparatus which performs wireless communication with a plurality of child stations in a predetermined communication cycle,
   wherein the communication apparatus monitors a number of child stations connected;
   and
   wherein a maximum number of times of transmission or maximum transmission time available within a duration of one communication cycle for each individual child station to transmit data is set in accordance with the number of child stations connected.

9. A program stored on a non-transitory computer readable medium executed by a processor for use with a computer for making a wireless communication device perform wireless communication in a predetermined communication cycle with at least one wireless game controller which transmits operation input data, the program making the computer perform the functions of:
   monitoring the number of wireless game controllers connected; and
   setting a maximum number of times of transmission or maximum transmission time available within a duration of one communication cycle for each individual wireless game controller to transmit operation input data, in accordance with the communication cycle and the number of wireless game controllers connected.

* * * * *